United States Patent [19]
Hodjat et al.

[11] Patent Number: 5,823,904
[45] Date of Patent: Oct. 20, 1998

[54] REINFORCED HUB, PULLEY

[75] Inventors: Yahya Hodjat, Oxford, Mich.; Michael H. Kutzscher, London, Canada

[73] Assignee: The Gates Corporation, Denver, Colo.

[21] Appl. No.: 752,681

[22] Filed: Nov. 19, 1996

[51] Int. Cl.⁶ .............................. F16H 55/50; F16H 55/49
[52] U.S. Cl. ............................................ 474/170; 474/902
[58] Field of Search .................................. 424/166, 168, 424/170, 176, 902

[56] References Cited

U.S. PATENT DOCUMENTS

| | | | |
|---|---|---|---|
| 861,288 | 7/1907 | Johnson | 427/176 |
| 2,269,821 | 1/1942 | Kemphert et al. | 474/902 |
| 4,098,137 | 7/1978 | Yaros | 474/170 |
| 4,824,422 | 4/1989 | Jocic | 474/170 |
| 5,465,485 | 11/1995 | Mikake et al. | 474/902 |
| 5,575,728 | 11/1996 | Cerny | 424/120 |
| 5,626,532 | 5/1997 | Cerny | 424/902 |

FOREIGN PATENT DOCUMENTS 4444526  11/1994  Germany.

*Primary Examiner*—Thomas R. Hannon
*Assistant Examiner*—Matthew A. Kaness
*Attorney, Agent, or Firm*—H. W. Oberg; C. H. Castleman, Jr.

[57] ABSTRACT

A pulley with an integral hub spun-roll formed of a disc of sheet metal where the hub has an annular ring extending radially outward of the hub and reinforcing the hub. Optionally, the hub has as integral flange that facilitates removal of the pulley from a shaft.

7 Claims, 3 Drawing Sheets

REINFORCED HUB, PULLEY

BACKGROUND OF THE INVENTION

The invention relates to a pulley of sheet metal made by spin-roll forming, but more particularly, the invention relates to a spun pulley with a reinforced hub and a method of making the pulley.

Pulleys with hubs of sheet metal may be shaped by press forming using a series of dies or spin forming using mandrels or rollers or a combination thereof. For example, a pulley with an integral hub that is pressed formed is disclosed in U.S. Pat. No. 4,824,422 to Jocic where the hub has an integral flange that facilitates removal of the pulley from a shaft. The belt receiving grooves are spin formed in the rim of the pulley. A troublesome area with the press forming process in making the integral hub is that it is drawn in the press forming process whereby the radial thickness of the hub is the same or thinner than the thickness of the sheet metal from which it is formed. Oftentimes, it is difficult to control the size of a bore to receive a shaft without some additional metal shaping process such as machining or sizing such as by pressing a ball through the bore of the hub. Another problem with the press forming process of making the hub is that the hub cannot be reinforced along its axial length unless perhaps by a folding process. Folded metal shapes and reinforcements introduce high stress areas as folds are subject to failure by cracking or fracturing from fatigue.

German Patent No. 4444526 assigned to WF Maschinenbau et al. discloses a method of shaping a hub by spin forming where a shaping roller is pressed against a side of a spinning annular disc of sheet metal that is supported at an opposite side with a head stock mandrel. The shaping roller is moved progressively radially inwardly against the side of the rotating disc which displaces a portion of metal while thinning part of the disc in forming a sidewall having a thickness that is less than the original sheet metal thickness. An annular wave is formed as metal is displaced and which progressively axially extends. A shaping roller presses the so annularly displaced metal against the mandrel while simultaneously forming a hub integral to the disc. A problem with the so spun formed hub is that it has a tendency to "spring back" to a larger diameter in areas where the hub has little or no support causing a slight taper in the bore of the hub. The maximum allowable variation of the ID of a hub for pressed on applications is 0.03 mm and such spun formed hubs have about 0.1 mm ID variation. Such spun formed hubs need to be further processed and sized such as by ball size finishing or machining (e.g. broaching) to fit a shaft.

SUMMARY OF THE INVENTION

A pulley with an integral hub in accordance with the present invention is spun-roll formed where a portion of sheet metal is radially and axially displaced from a side of the disc leaving a web. The so formed hub has at least one integral annular ring integral with the hub and having a diameter that is greater than the external diameter of the hub. The ring provides a reinforcement that inhibits hub "spring back." Optionally, the hub may include an integral flange sized to facilitate removal of the pulley from a shaft. A rim extends from the web and may have any desired configuration for engaging a power transmission belt as a V-ribbed belt.

In the process of the invention, a shaping roller is pressed against a side of a spinning annular disc of sheet metal. The shaping roller is moved progressively radially inwardly against the side of the rotating disc which displaces a portion of metal in the form of an axially extending annular wave. The so displaced metal is pressed by an axially moving shaping roller against a mandrel to form a hub that is integral with the web. The shaping roller includes at least one annular groove into which metal flows forming an integral reinforcing ring for the hub. The integral ring sufficiently reinforces the hub to substantially minimize "spring back" to minimize or eliminate further bore sizing processes.

Optionally, the hub includes a radial flange that facilitates removal of the pulley from a shaft. A generally radically protruding portion of metal forms against the shaping roller as the hub is formed. Optionally, the protruding portion of metal may be used to form a flange integral with a hub by pressing a finishing roller against the protruding metal.

An object of the invention is to provide a pulley with a hub that has sufficient strength whereby it does not need additional machining for sizing to fit a shaft.

Another object of the invention is to provide a pulley and a process for making a pulley with a flange that facilitates removal of a pulley from a shaft.

These and other objects and advantages of the invention will be apparent after reviewing the drawings and description thereof wherein.

DESCRIPTION OF PREFERRED EMBODIMENT

Figure 1:
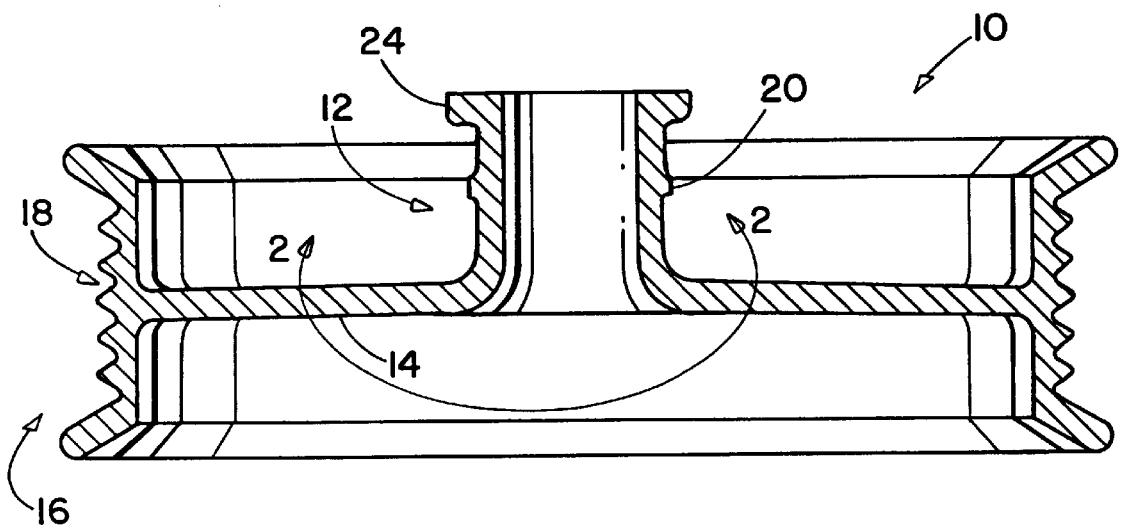
FIG. 1 is a diametrical cross section view of a pulley and hub of the invention.
Figure 2:
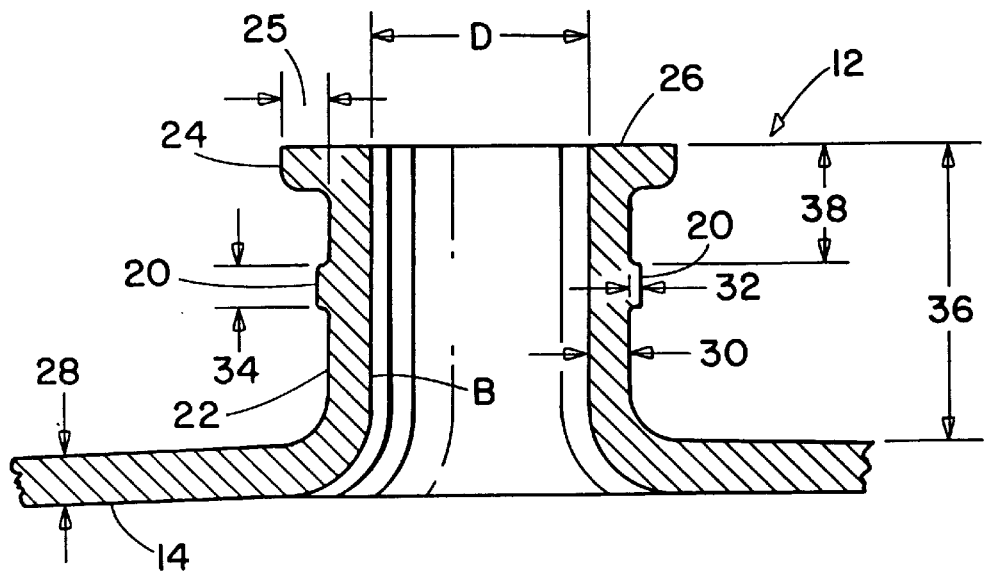
FIG. 2 is an enlarged view taken along the line 2—2 of FIG. 1 showing a hub of the invention.

Referring to FIGS. 1 and 2, a one piece pulley 10 of the invention has a hub 12 that is integral with a web 14 where the hub and web are spun-roll formed from a disc of sheet metal. A rim 16 extends from the hub and may have any desired configuration for operating with a power transmission belt (not shown). A V-ribbed pulley is illustrated where there are a plurality of V-grooves 18 for receiving a V-ribbed belt. The hub includes at least one or more annular reinforcing rings 20 integral with the hub 12 and extending radially outwardly from an outside diameter 22 of the hub. The reinforcement ring is sized and located to inhibit "spring back" of the hub after the spin forming process so that the bore B of the hub has inconsequential taper whereby it does not require additional machining to maintain a diameter D that is within tolerance for attaching to a shaft (not shown).

Optionally, a radial flange 24 with a radial thickness 25 may extend from the open end 26 of the hub and be integrally formed of the hub during the spin forming process. The hub 12 of the invention is formed integral with a web 14 having a thickness 28, and has a hub wall thickness 30, a ring reinforcing thickness 32, a reinforcing ring width 34, hub length 36 and a ring 20 located a distance 38 from the open end 26 of the hub. Of course, the reinforcing ring may have any desirable shape provided it sufficiently inhibits "spring back" of the hub after forming. A hub of the invention was made with the dimensions characterized in Table 1 and wherein the bore B of the hub required no additional machining to maintain an acceptable diameter.

TABLE 1

| | |
|---|---|
| Web Thickness, mm | 3 |
| Hub Wall Thickness, mm | 4 |
| Reinforcing Ring Thickness, mm | 1.4 |
| Reinforcing Ring Width, mm | 3.6 |
| Hub Length, mm | 24 |
| Inside Diameter, mm | 15.94–0 + 0.03 |
| Ring Location, mm | mid length |
| Flange Radial Thickness, mm | 3.5 |

The so manufactured bore had a taper that was less than 0.07 degrees whereas when compared to prior art hubs without rings the taper is about 0.03 degrees. In other terms, the so manufactured bore had an ID variation of 0.03 mm or less.

METHOD

Referring to FIGS. 3–6, an annular disc 40 having a thickness 41 is positioned for working with spin-roll forming machinery 42 that includes a head stock mandrel 44, a reciprocally movable mandrel 46, a first shaping roller 48, a holding roller 50, and a second shaping or finishing roller 52.

Figure 3:
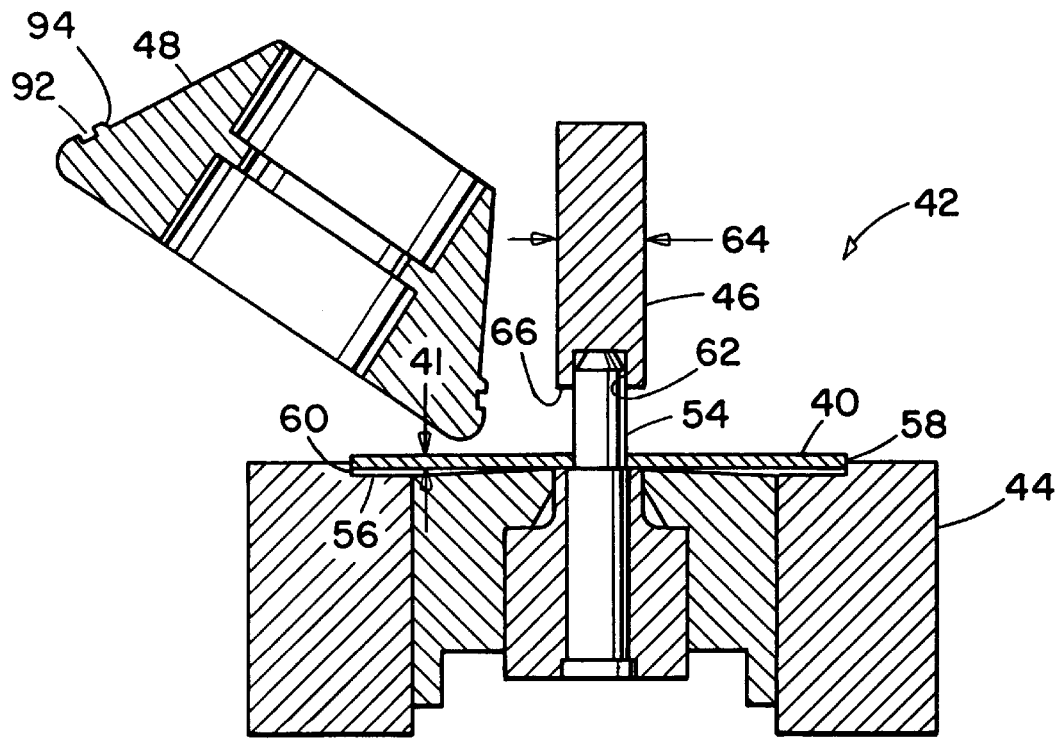
FIG. 3 is a schematic in cross section illustrating key elements of a spin-roll forming machine and an annular disc positioned in the machine for spin-roll forming.

In FIG. 3, the annular disc 40 is positioned over a pilot 54 of the head stock mandrel 44 where the outside diameter of the pilot is sized for an inside diameter D of the hub to be produced. The head stock mandrel 44 has a cylindrical recess 56 sized to receive the external diameter 58 of the disc and the recess has a depth 60 that is less than the thickness 42 of the disc.

The mandrel 46 has a pilot receiving bore 62, an external diameter 64, and a radial step 66 sized for a desired internal flange of the hub to be formed. The mandrel 46, first shaping roller 48, holding roller 50 and second shaping roller 52 are positioned away from the head stock mandrel 44 in a start position to facilitate loading and positioning the annular disc 40 over the pilot and against the head stock mandrel.

Figure 4:
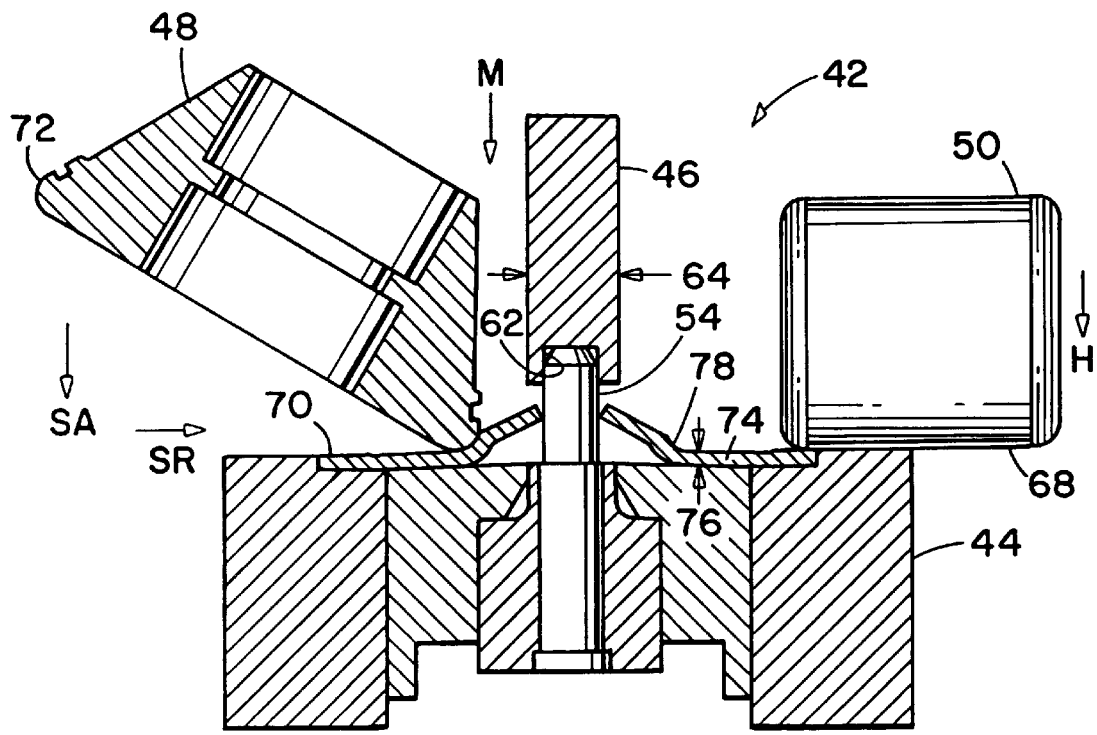
FIG. 4 is a view similar to FIG. 3 but showing a machine at a progressive operational step.

FIG. 4 shows the spin-roll forming machine 42 in an intermediate run position where the annular disc 40 is being shaped into a form, that when finished, includes an integral hub with an annular ring for reinforcing the hub. The mandrel 46 is moved in an axial direction M so that the pilot 54 is engaged with the pilot receiving bore 62. Holding roller 50 is shown in its operating position where it is moved in a direction H such that a cylindrical surface 68 presses against an exposed annular portion 70 of the disc to thereby hold it in a sandwiched position against the head stock mandrel.

The shaping roller 48 is transferred to its forming position by first moving it in a direction SA so that a rounded edge 72 of the shaping roller is pressing against the disc. The mandrel and head stock are rotated which spins the disc. Holding roller 50 and shaping roller 48 are free to rotate to spin with the disc. The shaping roller with its rounded edge 72 displaces a portion of metal from the disc which is supported at an opposite side by the head stock mandrel. The shaping roller is moved SR progressively radially inwardly against the side of the disc which displaces metal from the side of the disc while forming a web having a thinner sidewall 76 than the sheet metal. The shaping roller forms a progressively axially extending wave 78 of displaced metal.

Figure 5:
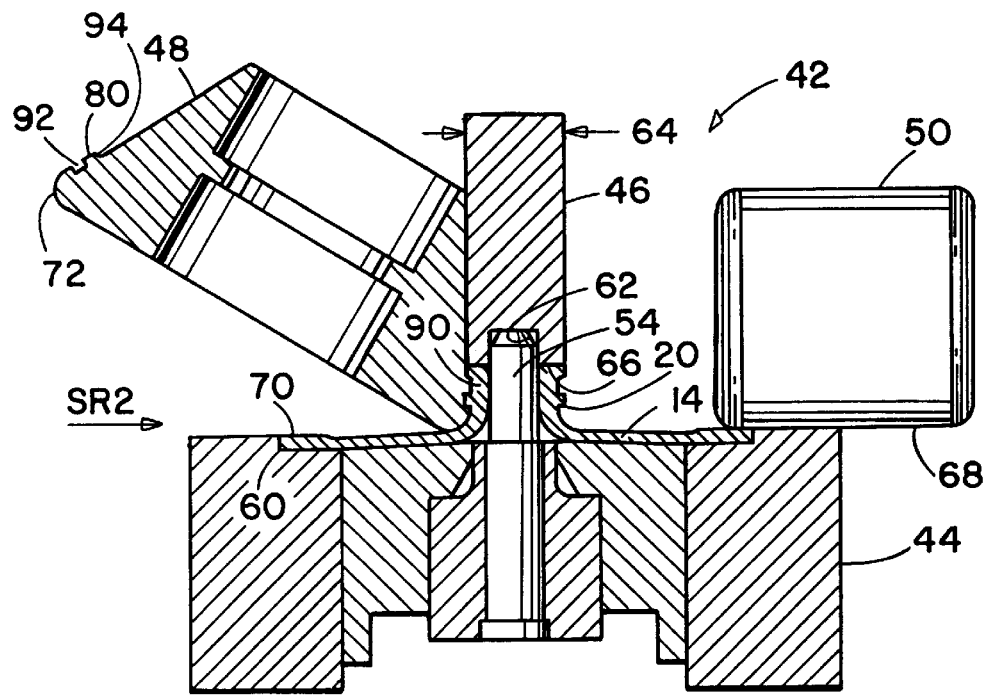
FIG. 5 is a view similar to FIG. 3 but showing a machine at a progressive operational step.

Referring to FIG. 5, the shaping roller continues to move progressively radially inwardly in the he direction SR2 and the displaced metal lengthens axially and is contacted by tapered surface 80 of the shaping roller. The tapered surface is oriented so as to be substantially parallel to the axis of the head stock mandrel 44 and mandrel 46. Contact with the tapered surface causes the wave to take an initial hub shape 90. The tapered surface of shaping roller 48 also includes an annular groove 92 having a location and shape sized to a desired reinforcing ring 20 to be formed. The shaping roller may also include an obverse tapered edge 94 for preforming an integral flange.

Figure 6:
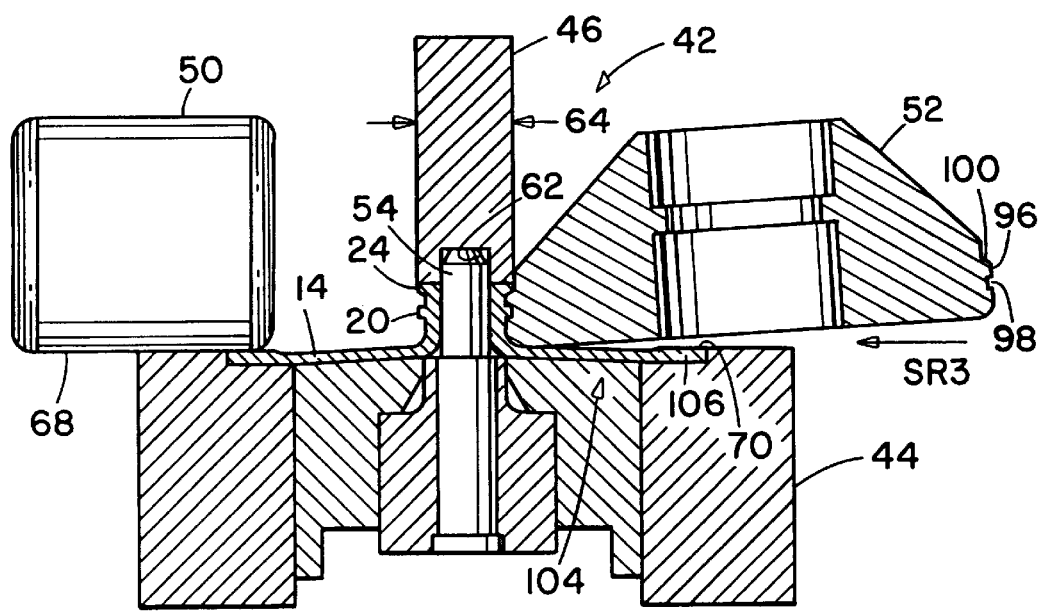
FIG. 6 is a view similar to FIG. 2 but showing a final spin-roll forming operation and forming a hub for a pulley of the invention.

The radially inward movement of the first shaping roller is stopped at a predetermined position as it approaches the mandrel 46. As shown in FIG. 6, the secondary shaping or hub finishing roller 52 is activated and positioned with a tapered surface 96 against the displaced metal forming the hub. The tapered surface 96 is positioned to be substantially parallel with the axes of the rotating head stock mandrel 44 and mandrel 46 when it is in contact with the displaced metal that forms the hub. The tapered surface of finishing roller also includes an annular groove 98 with a shape corresponding to the shape of the reinforcing ring to be formed. A step 100 may optionally be formed in the finishing roller 52 and has a configuration sized for shaping the integral, radial flange 24. The diameter 64 of the mandrel 46 corresponds to the outside diameter of the flange 24 that is produced.

The so formed disc 104 as shown in FIG. 6 is removed from the machine for subsequent processing steps. An annular portion 106 is split and rolled by known processes into the rim configuration as illustrated in FIG. 1.

The foregoing detailed description is made for purposes of illustration only and is not intended to limit the scope of the invention to be determined from the appended claims.

What is claimed is:

1. A pulley with an integral hub that is spun-roll formed from a disc having a thickness, the hub having a bore, a generally cylindrical external surface, a radial thickness, and formed with a portion of metal radially displaced from a side of the disc leaving a web portion having a web thickness, wherein the improvement comprises:

the hub having at least one annular ring integral with the hub and extending radially outwardly from the external surface of the hub and spaced from an open end of the hub and intermediate the web and wherein the ring provides a reinforcement to the hub.

2. The pulley as claimed in claim 1 wherein the bore has a taper that is less than 0.7 degrees with respect to a longitudinal axis of the bore.

3. The pulley as claimed in claim 1 and including a flange extending radially outward from the external surface and integral with the hub.

4. The pulley as claimed in claim 3 wherein the annular ring is intermediate the flange and the web.

5. The pulley as claimed in claim 1 wherein the pulley has a rim integral with the web and which defines a belt engaging surface.

6. The pulley as claimed in claim 5 wherein the belt engaging surface comprises a plurality of belt engaging V-grooves.

7. The pulley as claimed in claim 1 wherein an inside diameter of the bore has a variation that is equal to or less than 0.03 mm.

* * * * *